April 21, 1925.
W. W. CASHEL, SR
SHOCK ABSORBER
Filed May 2, 1923
1,534,502
2 Sheets-Sheet 1
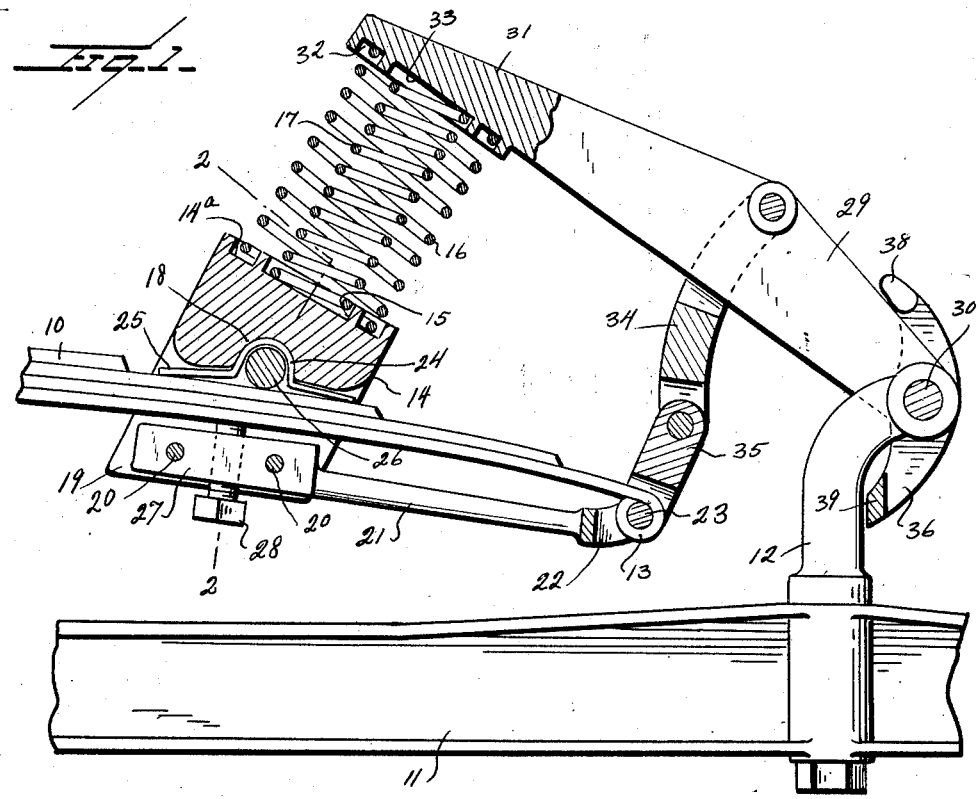
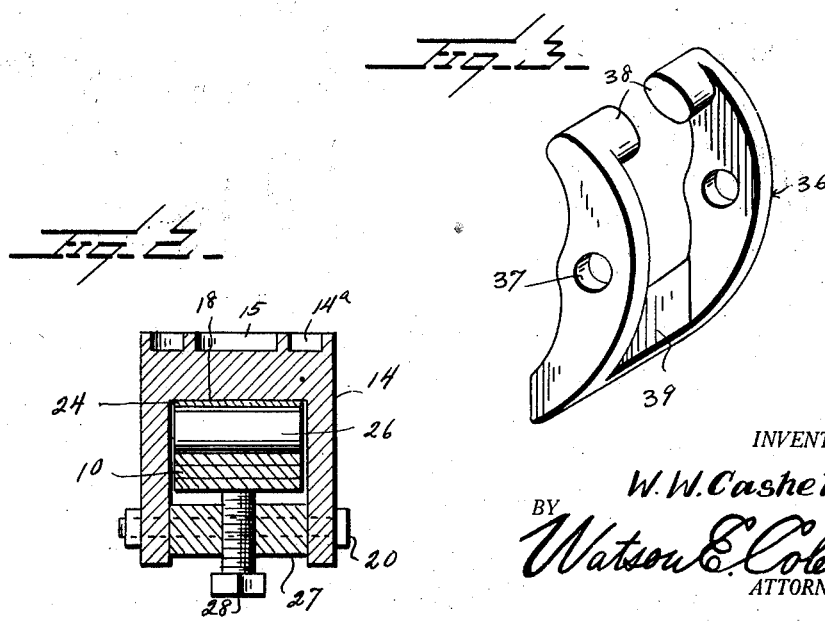
INVENTOR.
W. W. Cashel, Sr.
BY Watson E. Coleman
ATTORNEY.

April 21, 1925.  1,534,502
W. W. CASHEL, SR
SHOCK ABSORBER
Filed May 2, 1923  2 Sheets-Sheet 2
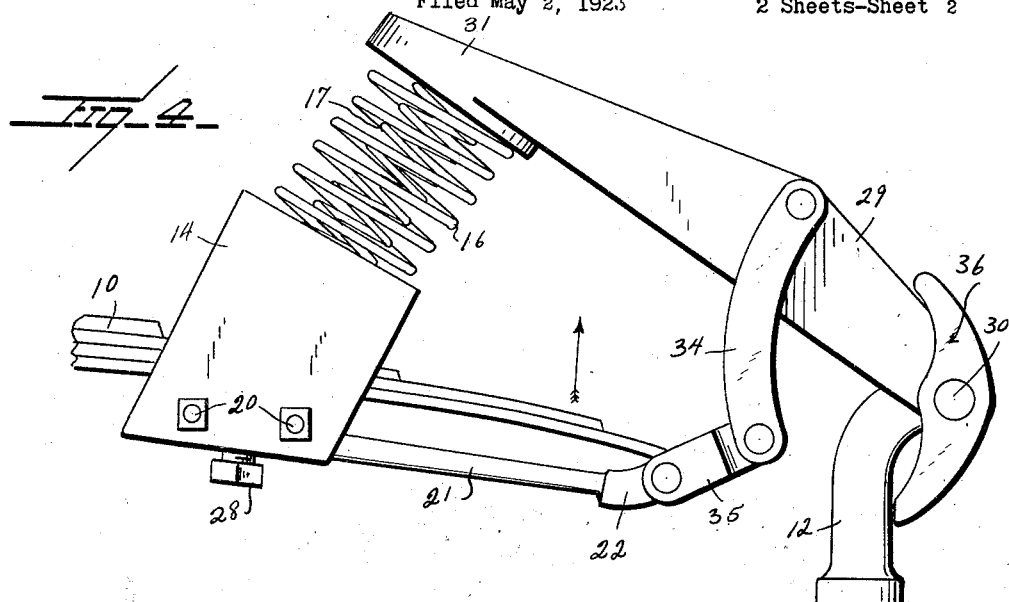
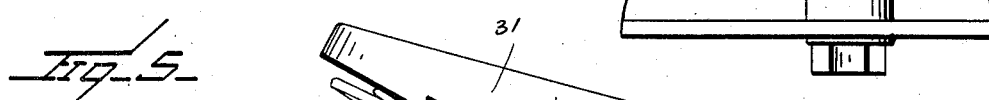
INVENTOR.
W. W. Cashel, Sr.
BY Watson E. Coleman
ATTORNEY.

Patented Apr. 21, 1925.

1,534,502

UNITED STATES PATENT OFFICE.

WILLIAM W. CASHEL, SR., OF CASPER, WYOMING.

SHOCK ABSORBER.

Application filed May 2, 1923. Serial No. 636,223.

*To all whom it may concern:*

Be it known that I, WILLIAM W. CASHEL, Sr., a citizen of the United States, residing at Casper, in the county of Natrona and State of Wyoming, have invented certain new and useful Improvements in Shock Absorbers, of which the following is a specification, reference being had to the accompanying drawings.

This invention relates to shock absorbers.

An important object thereof is to provide a device of this character which is simple in its construction and operation, will be durable and efficient in service and a general improvement in the art.

A further and important object of the invention is to provide in a shock absorber of that character wherein a spring seat is mounted upon a main spring of the vehicle to coact with a movable spring seat carried by a lever mounted upon a fixed part of the vehicle, the mounting for the spring seat carried by the vehicle spring being of such character that it does not interfere with the normal operation of the vehicle spring.

A still further object of the invention is to provide a device of this character which is readily assembled and which includes means to maintain the vehicle spring carrying the seat.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a side elevation partly in section showing a shock absorber constructed in accordance with my invention applied to a vehicle;

Figure 2 is a section on the line 2—2 of Figure 1;

Figure 3 is a perspective of the lever stop member employed;

Figure 4 is a front elevation showing the action of the shock absorber during rebound movement; and Figure 5 is a similar view showing the action of the shock absorber during compression of the vehicle springs due to jar applied to the vehicle.

Referring now more particularly to the drawings, the numeral 10 indicates the main spring of a vehicle of the usual construction, 11 the axle of the vehicle or other fixed part thereof, 12 an eye bolt to which the eye 13 of the vehicle is usually connected by a shackle not herein shown.

In accordance with my invention I provide a spring seat 14 adapted to be applied to the main spring of the vehicle and comprising an inverted U-shaped member, the bight portion of which is provided upon its upper surface with recesses 14ª and 15 receiving the lower ends of the shock absorber springs. The under surface of the bight portion of the U-shaped member is provided with a transverse groove 18 extending entirely thereacross between the arms 19. The arms 19 are of sufficient length to project below the lower surface of the lower leaf of the spring 10 and has extended therethrough a pair of spaced securing elements 20 which are directed through the forward end of a link 21, each end of which includes spaced arms 22 through which is directed a pivot bolt 23 extending through the eye 13 of the main spring 10.

The groove 18 forms a mounting for the curved central portion 24 of a light spring 25 which extends longitudinally of the main spring 10 and has its ends engaging against this main spring by reason of inherent resiliency. Between the engaged upper leaf of the spring 10 and the bight portion 24 of the spring 25 a steel roller 26 is disposed transversely against the leaf of the main spring forming an anti-friction mounting therefor. The end of the link 21 engaging between the arms 19 of the U-shaped member is broadened as at 27 so that it fits between these arms and prevents twisting movement of the spring seat upon the spring. Through this broadened portion is directed an adjusting member 28 preferably in the form of a set screw threaded in the plate and extending therethrough to engage the under surface of the lower leaf of the spring so that the spring 10 may be adjusted upwardly to regulate the tension with which the spring 25 engages thereagainst. As is well known to those familiar with the art the leaves of each spring have relative shifting movement during a bending of the spring. When the spring is fully flexed the ends of the upper leaves are disposed at points inwardly of the points assumed thereby when the spring is compressed. Accordingly when it is desired to have a fixed mounting for the spring seat 14 carried by the spring 10 it is necessary that provision be made for the movement of these upper portions. This I accomplish by the structure hereinbefore described which provides an anti-friction surface against which the engaged spring seat may shift without material resistance. At the same time the action of the light spring 25 carried by the spring seat serves to prevent the oscillatory movement of the spring seat 14 which would ordinarily be present where this spring was not provided. Such movement is further resisted by the link 21, the principal function of which is, however, to maintain the spring seat 14 in a relatively fixed position upon the spring 10 as regards the lower or main leaf thereof.

A lever 29 has one end thereof pivotally engaged with a pivot bolt 30 directed through the eye of the eye bolt 12. The opposite end of this lever extends over the spring seat 14 and is provided with a seat 31 having recesses 32 and 33 therein similar to the recesses 14ª and 15 of the spring seat 14 and receiving the upper ends of the springs 16 and 17 respectively. To this lever at a point intermediate its ends I pivotally engage one end of a link 34, the opposite end of which is pivotally engaged by one end of a second link 35, the free end of the link 35 being pivotally engaged with the pivot bolt 23 directed through the eye 13 of the main spring 10. The pivot bolt 30 directed through the eye of the eye bolt 12 forms a mounting for a stop member 36. This stop member is substantially U-shaped in form having openings 37 formed intermediate the ends of the arms thereof receiving the ends of the pivot bolt 30. The arms at their ends are formed with lugs 38 overlying the upper surface of the lever 29 and the bight portion 39 of the member 36 is adapted to engage against the body of the eye bolt 12. It will be seen that when the bight portion 39 is in engagement with the eye bolt 12 and the lever 29 in engagement with the lugs 38, further movement of this lever is prevented. This action occurs during a rebound action such as illustrated in Figure 4, in which it will be seen that the upward movement of the lever 29 is checked by a member 36. It will be seen that continued upward movement of the spring 10 will cause a movement of the spring seats 31 and 14 toward one another with the result that the springs 16 and 17 are compressed and this upward movement checked. During downward movement of the spring 10 as a result of a shock imparted to the vehicle this downward movement will cause straightening of the links 35 and 34 with the result that a direct tension is placed upon the lever 29 thereby. This tension being placed upon the lever at a point intermediate its ends, causes a downward movement of the free end of the lever greater than the downward movement of the seat 14 and accordingly these seats will approach compressing therebetween the springs 16 and 17 and applying their resistance to said downward movement in a degree proportionate thereto.

From the foregoing it is believed to be obvious that in a shock absorber constructed in accordance with my invention the spring carried spring seat is held substantially immovable upon the spring as regards the main leaf thereof and is so constructed as to prevent all unnecessary movement of the upper leaves without any material interference therewith. It will furthermore be obvious that the construction hereinbefore set forth is capable of some change and modification without materially departing from the spirit of my invention and I accordingly do not limit myself to such specific structure except as hereinafter claimed.

What is claimed is:—

1. In a shock absorber and in combination with a leaf spring and support therefor arranged adjacent one end of the spring, a spring seat secured to the spring at a point spaced from the end thereof, a lever pivoted to the support and having a spring seat opposing the spring seat of the spring, a spring extending between said spring seats and tending to separate the same, and a connection between the lever, at a point intermediate the spring seat thereof and the support, and the spring at the end thereof permitting movement of the spring toward the lever without transmitting movement from the spring to the lever and during movement of the spring in the opposite direction moving the lever with the spring.

2. In a shock absorber and in combination with a leaf spring and support therefor arranged adjacent one end of the spring, a spring seat secured to the spring at a point spaced from the end thereof, a lever pivoted to the support and having a spring seat opposing the spring seat of the spring, a spring extending between said spring seats and tending to separate the same, and a connection between the lever, at a point intermediate the spring seat thereof and the support, and the spring at the end thereof permitting movement of the spring toward the lever without transmitting movement from the spring to the lever and during movement of the spring in the opposite direction moving the lever with the spring, said support and lever having means associated therewith limiting movement of the lever away from said support.

3. In a shock absorber and in combination with a leaf spring and support therefor arranged adjacent one end of the spring, a spring seat secured to the spring at a point spaced from the end thereof, a lever pivoted to the support and having a spring seat opposing the spring seat of the spring, a spring extending between said spring seats and tending to separate the same, a connection between the lever, at a point intermediate the spring seat thereof and the support, and the spring at the end thereof permitting movement of the spring toward the lever without transmitting movement from the spring to the lever and during movement of the spring in the opposite direction moving the lever with the spring, comprising a link pivoted to the end of the spring, a link pivoted to the lever, and a pivotal connection between the free ends of said links.

4. In a shock absorber and in combination with a leaf spring and support therefor arranged adjacent one end of the spring, a spring seat secured to the spring at a point spaced from the end thereof, a lever pivoted to the support and having a spring seat opposing the spring seat of the spring, a spring extending between said spring seats and tending to separate the same, a connection between the lever, at a point intermediate the spring seat thereof and the support, and the spring at the end thereof permitting movement of the spring toward the lever without transmitting movement from the spring to the lever and during movement of the spring in the opposite direction moving the lever with the spring, comprising a link pivoted to the end of the spring, a link pivoted to the lever, and a pivotal connection between the free ends of said links, said lever and support having connecting means limiting the movement of the lever in a direction away from the spring.

In testimony whereof I hereunto affix my signature.

WILLIAM W. CASHEL, Sr.